(12) United States Patent
Miller, Jr. et al.

(10) Patent No.: US 12,742,625 B2
(45) Date of Patent: Sep. 22, 2026

(54) CASE LENGTH TRIMMER (CLT) WITH MICRO-ADJUSTMENT TOOL AND METHOD OF USING SAME

(71) Applicant: K&M Shooting Products, LLC, Holland, MI (US)

(72) Inventors: Roger G. Miller, Jr., West Olive, MI (US); David A. Allen, Grandville, MI (US); Brady C. Haas, Delton, MI (US)

(73) Assignee: K&M Shooting Products, LLC, Holland, MI (US)

( * ) Notice: Subject to any disclaimer, the term of this patent is extended or adjusted under 35 U.S.C. 154(b) by 0 days.

(21) Appl. No.: 18/971,851

(22) Filed: Dec. 6, 2024

(65) Prior Publication Data

US 2025/0189283 A1 Jun. 12, 2025

Related U.S. Application Data

(60) Provisional application No. 63/606,799, filed on Dec. 6, 2023.

(51) Int. Cl.
*F42B 33/10* (2006.01)
*B23B 51/00* (2006.01)

(52) U.S. Cl.
CPC .......... *F42B 33/10* (2013.01); *B23B 51/0018* (2013.01)

(58) Field of Classification Search
CPC .... B23B 51/0018; F42B 33/004; F42B 33/10; F42B 35/02
See application file for complete search history.

(56) References Cited

U.S. PATENT DOCUMENTS 4,813,827 A * 3/1989 Dugger .................. B23B 5/168 86/44
5,125,316 A * 6/1992 Markle .................. F42B 33/10 86/24
5,309,801 A 5/1994 Markle
5,309,813 A * 5/1994 Henley .................. F42B 33/10 86/24
5,635,661 A * 6/1997 Tuftee .................. F42B 33/10 86/24
5,649,465 A * 7/1997 Beebe .................. F42B 33/10 86/24
6,192,561 B1 * 2/2001 Bennett .................. F42B 33/10 86/19.5
6,397,720 B1 * 6/2002 Fox .................. F42B 33/10 86/24
6,484,616 B1 * 11/2002 Giraud .................. B23P 23/02 86/19.5
7,650,825 B1 * 1/2010 Lee .................. B23B 5/168 86/24
11,300,394 B2 * 4/2022 Kinney .................. B23B 5/168
2018/0361483 A1 * 12/2018 Goodman .............. F42B 35/02

* cited by examiner

*Primary Examiner* — Bret Hayes
(74) *Attorney, Agent, or Firm* — Frank M. Scutch, III

(57) ABSTRACT

A Case Length Trimmer (CLT) combines three cutting features in a single hand tool with independent micro adjustability. The CLT operates to cut a ammunition casing to an overall length and chamfers the inside and outside case mouth diameters. Customization with multiple pilots and flash hole pin sizes maintain a consistent cut. The CLT uses these components to set actual overall case length for accuracy. The CLT can also utilizing a Micro-Adjustment Tool (MAT) for allowing precision adjustment of each parameter. These tools are can be used by individually and collectively adding a new level of consistency and precision to ammunition reloading.

7 Claims, 6 Drawing Sheets

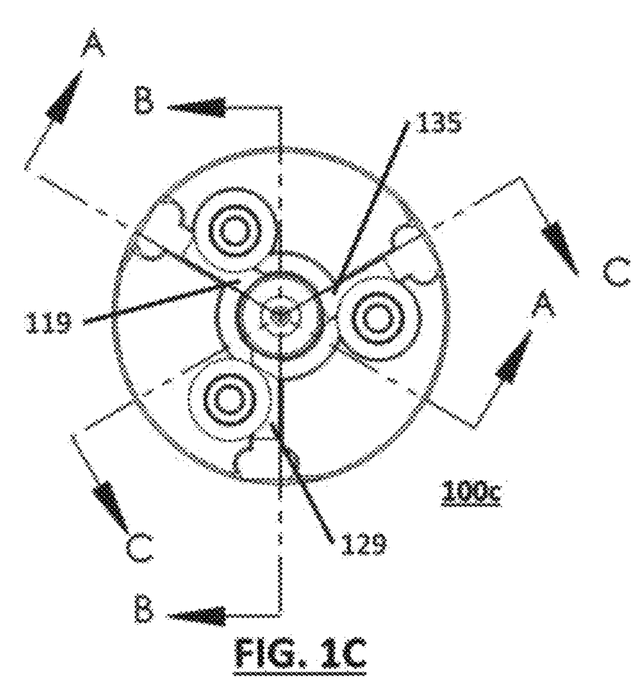
FIG. 1C
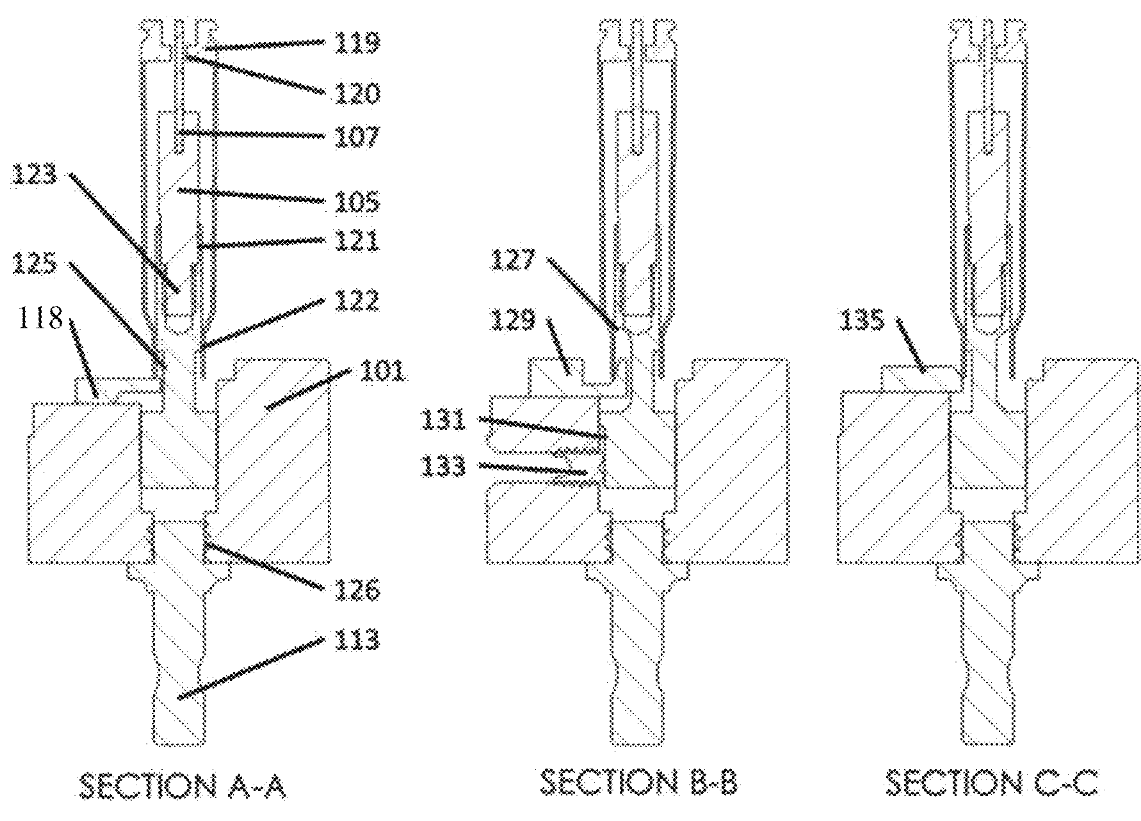
FIG. 1D
FIG. 1E
FIG. 1F
100d
100e
100f

200a

200b

300b

CASE LENGTH TRIMMER (CLT) WITH MICRO-ADJUSTMENT TOOL AND METHOD OF USING SAME

FIELD OF THE INVENTION

The present invention relates generally to precision firearm ammunition reloading and more particularly to tools used in machining a casing to a desired length.

BACKGROUND

One of the steps needed when reloading firearm ammunition occurs when the casing must be no longer than a predetermined length. For high accuracy and precision shooting, many reloading factors influence down-range results. Precision reloaders want casings to be identical in every aspect. One of these factors is the casing length relative to the chamber length. Those skilled in the art will recognize that after repeated reloading of ammunition casings, the overall length of the cartridge grows in length due to extreme pressure extruding of the casing during firing and further lengthening from subsequent resizing of the casing for reloading.

Although the prior art includes devices and tools to trim the casing to length using a blade to shorten the case length, these devices typically include a multi-surface cutter used for secondary operation(s). The multi-surface cutter works to chamfer the inside and outside diameter edges to remove burrs in the trimming process. These methods either require intensive adjustment to achieve desired chamfering or time-consuming multi-step operations. Thus, new types of tools are needed to more easily attend to the cutting and deburring processes during case trimming for ammunition reloading.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1C is a top view of the CLT shown in FIG. 1B with cross-section lines A, B, and C.

FIG. 1D, FIG. 1E, and FIG. 1F are cross-sectional views through section lines A-A, B-B and C-C respectively illustrating the CLT of the present invention.

DETAILED DESCRIPTION

Figures 1A, 1B:
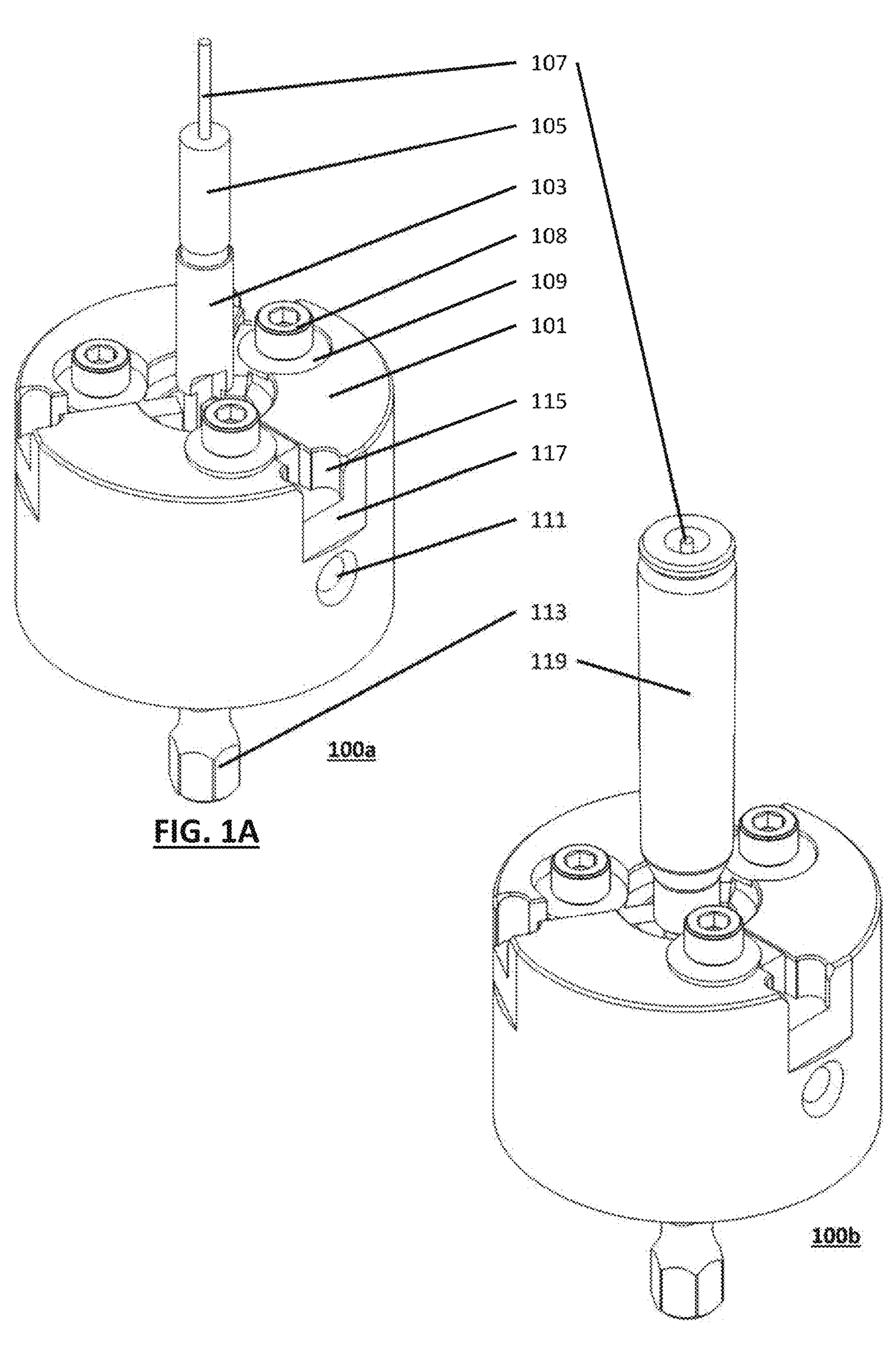
FIG. 1A is a perspective view illustrating a Case Length Trimmer (CLT) with casing specific pilot, stem and pin.
FIG. 1B illustrates the CLT of FIG. 1A where a cartridge configured in the working position of the CLT.

Before describing in detail embodiments that are in accordance with the present invention, it should be observed that the embodiments reside primarily in combinations of method steps and apparatus components related to a case length trimmer used generally for reloading ammunition and more specifically to a cutting tool generally used in applications requiring precise, independent adjustments. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1A is a perspective view illustrating a case length trimmer (CLT) with casing specific pilot, stem and pin. FIG. 1B is the CLT of FIG. 1A where a casing is shown in the "working" position for trimming. FIG. 1C is a top view of FIG. 1B with cross-section lines A, B, and C represented in the cross-sectional views of FIG. 1D, 1E, and 1F respectively illustrating the three cutting tools for the present invention.

With regard to each of FIG. 1A, FIG. 1B, FIG. 1C, FIG. 1D, FIG. 1E and FIG. 1F, the CLT housing or main body 101 works to hold together all components for trimming and chamfering a casing 119. A caliber specific pilot 103, with multiple diameters, is used to accommodate a close fit to the sized casing. A neck/bullet tension pilot 103, is fastened in place with a screw 133 against a flat recess 131, or similar, accessed through an aperture or hole 111. The pilot 103 accepts various Case Length Stem sizes (CLS) 105 and multiple geometry Flash Hole Pins (FHP) 107.

A plurality of casing cutters are used for cutting the face of casing 119 while chamfering an inside section and outside section which are held in place by a fasteners 108 and spring washers 109. The cutter is typically a sharp metallic blade allowing the cutting and removal of brass cartridge material. In use, the CLT 101 can be rotated with a drill or other motor using a hex adapter 113 having a shank that is attached to the CLT with threads 126 or similar. The CLT 101 is held in place with a handle 201 with locking fastener 203.

Figures 2A, 2B:
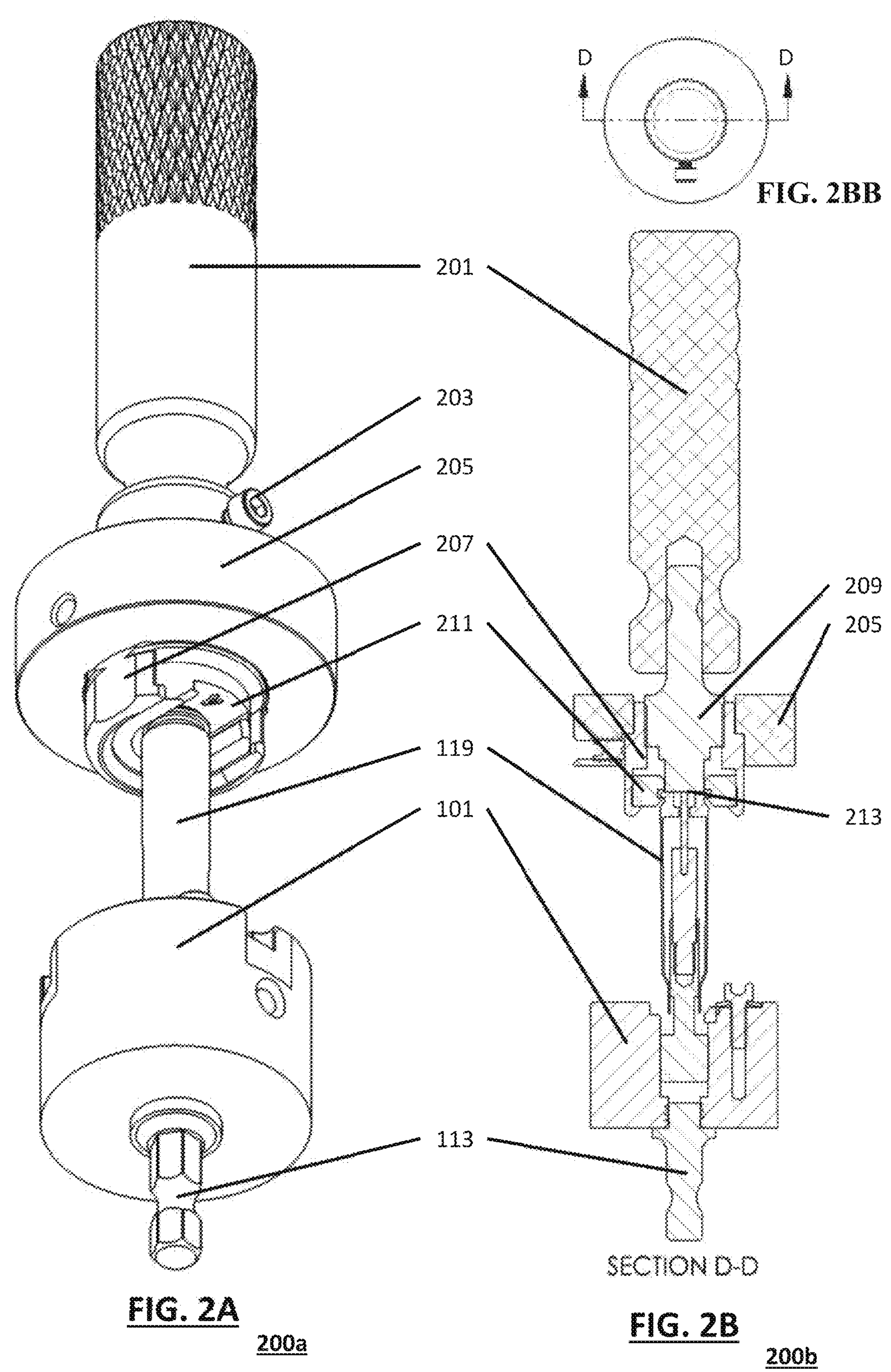
FIG. 2A is the CLT shown in FIG. 1B and including a Power Adapter and Handle (PA) for fixing the casing during operation.
FIG. 2BB and FIG. 2B are a top view and a cross-sectional view through section lines D-D respectively illustrating the contact and interaction of the CLT and PA with a casing.

In another embodiment, FIG. 2A, FIG. 2BB and FIG. 2B illustrate the CLT shown in FIG. 1B including a Power Adapter (PA), collectively 205, 207, and 209, and PA Handle 201 for fixing the casing in position during operation. Alternatively, the handle 201 can be installed on a hex adapter of the CLT and held fixed while the power adapter assembly is driven. The FHP 107 extends through the casing flash hole 120 to guide and set the casing overall length 213 by stopping against a hardened face of a Power Adapter inner screw 209. The CLS 105 is fixed guided and aligned 122 in the pilot 103 by threads 123 or other means. A recess 125 in the pilot is required for the end cutter 118 to fully engage with the mouth of the casing 119. The inside chamfer cutter 129 requires additional clearance 127 in the pilot 103. The outside chamfer cutter 135 is in open space and does not require additional clearances.

In this embodiment, the casing is held with an appropriate shell/casing holder 211 which is installed in a Shell Holder Retainer 207. The Shell Holder Retainer 207 is threaded in order to clamp the casing against an inner stem 209. A Power Grip 205 adapter is used for additional hand tightening torque with a larger diameter ergonomic grip.

Figures 2C, 2D:
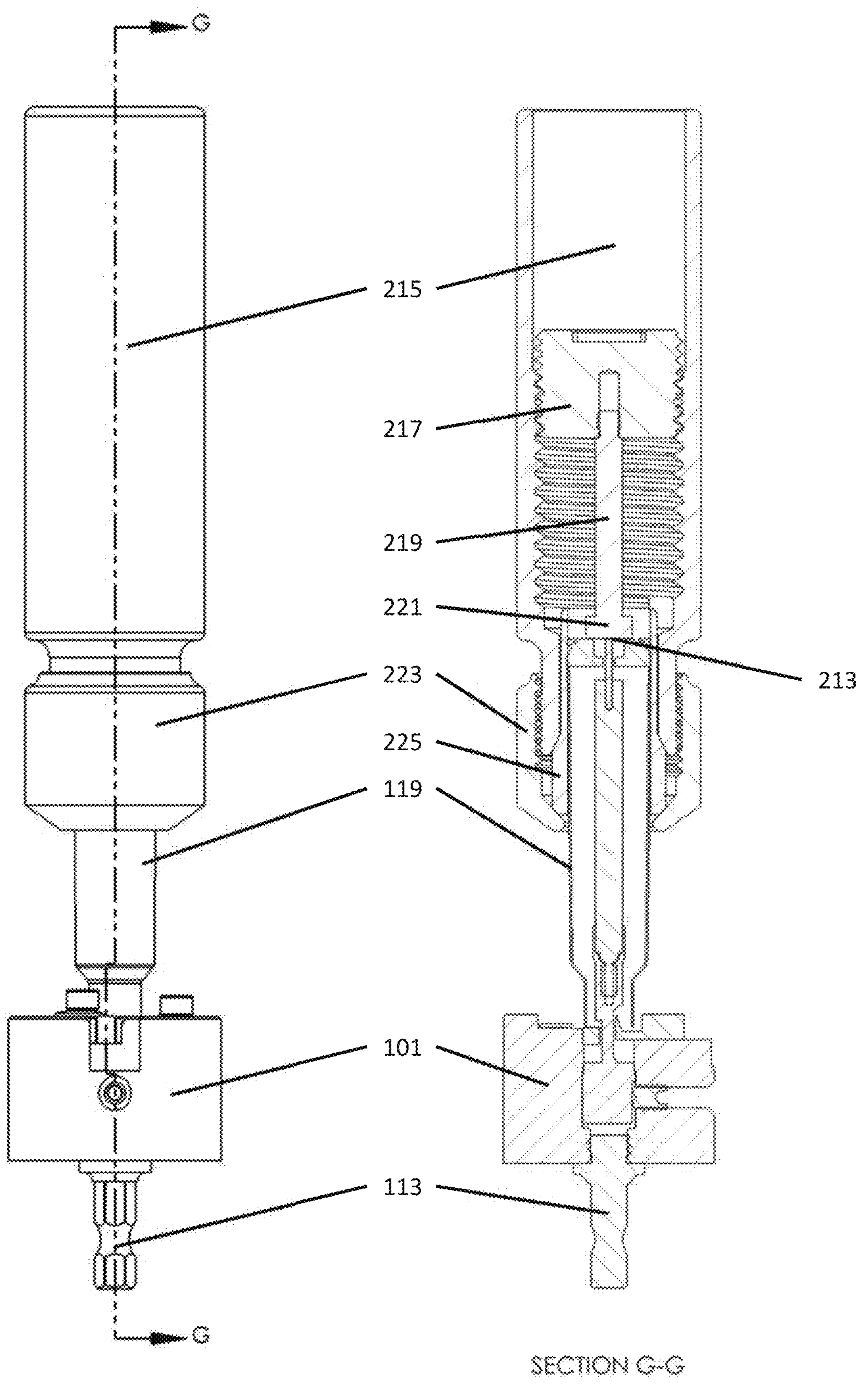
FIG. 2C is the CLT shown in FIG. 1B illustrating the use of an Ergonomic Casing and Tool Holder (ECTH) for fixing the casing during sizing operation.
FIG. 2D is a cross-sectional view through lines G-G illustrating the contact and interaction of the CLT and ECTH with a casing.

FIG. 2C and FIG. 2D illustrate one of many possible alternate embodiments of securing a casing with an Ergonomic Casing and Tool Holder (ECTH). An ECTH comprises a housing 215, a collet 225 or other clamping mechanism, a clamping cap 223, an adjustable backstop 217 with interchangeable extensions 219, and a hard-stop 221 for setting case length 213 with FHP 107 contact.

Figures 3A, 3B:
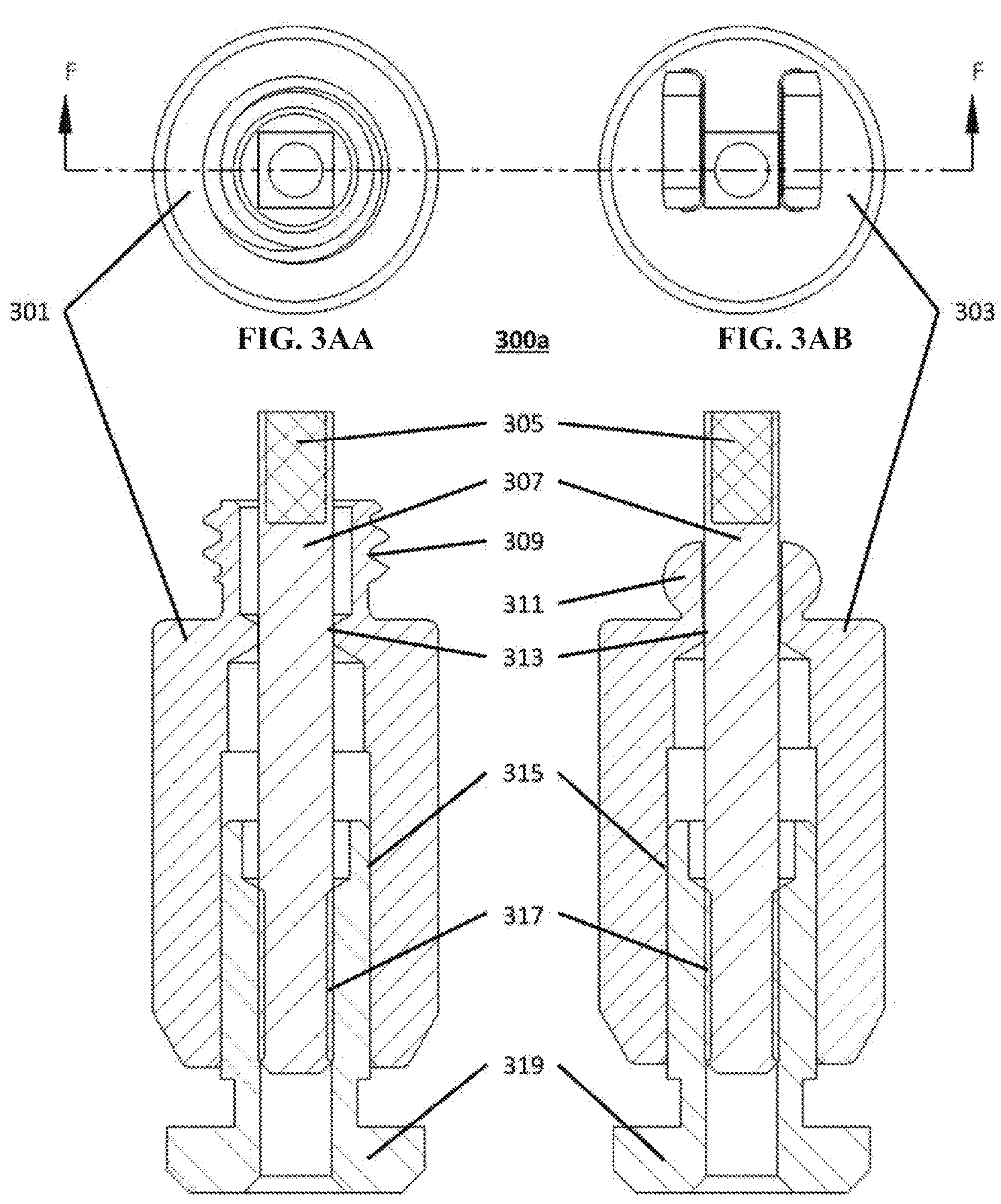
FIG. 3AA and FIG. 3AB are top views of a keyed Micro-Adjustment Tool (MAT) and a threaded MAT respectively used for adjusting cutter positions relative to the casing.
FIG. 3B is a cross-sectional view through lines F-F illustrating the inner workings of the MAT.

FIG. 3AA, FIG. 3AB and FIG. 3B illustrate a threaded Micro-Adjustment Tools (MAT) 301 and keyed MAT 303 used for adjusting cutter positions relative to the casing. In use, each cutter on the CLT can be precisely adjusted using Micro-Adjustment Tool (MAT) 303 having a ball 311 and utilizing a first key 115 and second key 117. The casing overall length is set by using the threaded 309 MAT 301 to be attached to a CLT mating feature 323.

The micro adjustment is achieved using a different thread pitch on the spindle 307 outer thread 317 and thimble 319 outer thread 315. The spindle 307 is constrained from rotating with a matching, non-circular geometry 313 in the MAT. Thus, spindle 307 includes an anti-rotation constraining feature or structure. The first key 115 and second key 117 are both keying structures that allow the geometry of MAT ball 311 to lock into the cutting head when setting up and making micro-adjustments for the outside and inside chamfer cutters. First key 115 and second key 117 are machined on the end cutting tool position for symmetry having these are not need for an end cut.

Figures 3C, 3D:
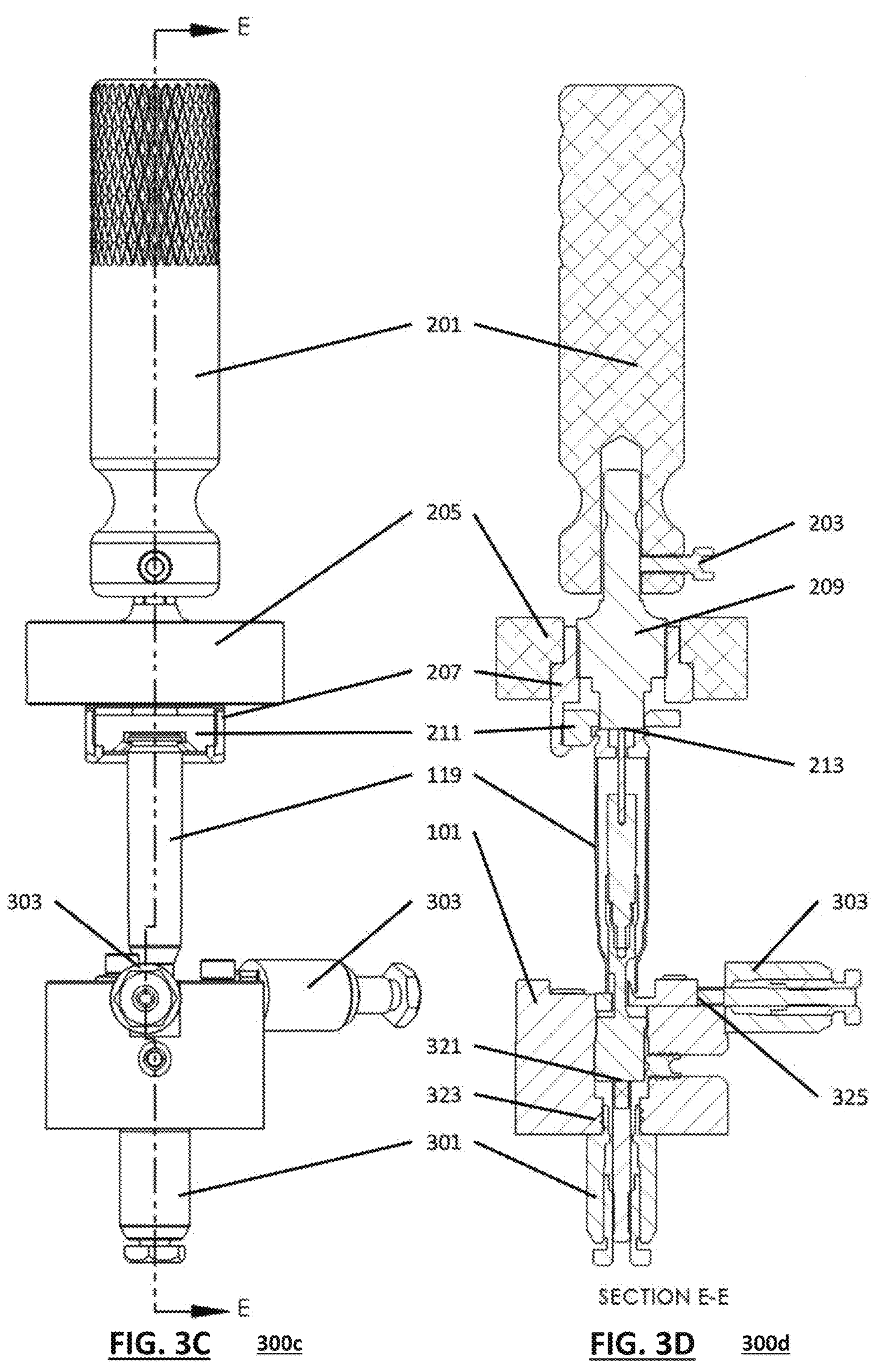
FIG. 3C is a side view of the CLT with a Micro-Adjustment Tool (MAT) used for adjusting cutter positions relative to the casing.
FIG. 3D is a cross-sectional view through lines E-E illustrating the interaction of keyed MAT with the CLT.

FIG. 3C and FIG. 3D illustrate a side and cross-sectional view respectively of the CLT system with two keyed MATs 303 for adjusting cutter positions relative to the casing and one threaded MAT 301 for adjusting the pilot 103 protrusion to set the casing overall length. A magnet 305 maintains contact with the adjustment spindle 307 and component to be moved-either the pilot 321 or cutters 129, 135. Thus, those skilled in the art will appreciate that other tools in the prior art do not have the ability to independently adjust cutters as in the current invention. This adjust occurs without affecting cutting results of the other cutters. This allows a more precise cut and/or chamfer allow for a more consistent and accurate ammunition reload.

The method for using the CLT begins where a brass firearm casing is prepared for trimming to length or squaring the case mouth. As described above, the CLT precisely cuts and chamfers the casing in one operation. As described herein, the CLT is used by following the steps of a) selecting the appropriate pilot, CLS, FHP, casing holder, and cutters; b) adjusting the pilot protrusion to set the case length with a threaded MAT or using a master sample; c) adjusting the cutters with a keyed MAT with multiple test cuts or using a master sample; d) spinning either the CLT or casing holder; e) guiding the mouth of the casing neck with a pilot and the flash hole of the casing base with the FHP; and f) stopping cutting action by contacting the FHP with a casing holder hard-stop.

Thus, the apparatus and methods described herein provide CLT which is an ammunition case cutting tool having three types of cutting namely, an end cutter for cutting an end of an ammunition casing, an inside chamfer cutter for shaping an inside surface of the ammunition casing and an outside chamfer cutter for shaping an outside surface of the ammunition casing. The CLT tool is rotated in order to allow various cutters to machine the ammunition casing to a predetermined overall length in preparation for a firearm ammunition reload. In other embodiments, a micro-adjust tool (MAT) is used with the CLT that enables independent adjustment of all operations during ammunition case trimming which can be done sequentially and simultaneously.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A case length trimmer (CLT) tool for use in reloading firearm ammunition comprising:

an end cutter for cutting an end of an ammunition casing;

an inside chamfer cutter for shaping an inside surface of the ammunition casing;

an outside chamfer cutter for shaping an outside surface of the ammunition casing;

a pilot having case neck stem extending therefrom positioned between a plurality of fasteners, for guiding a case neck over the tool such that the stem is configured to extend through a primer hole in the casing;

a case length hard-stop; and wherein the end cutter, inside chamfer cutter, outside chamfer cutter are each independently adjustable and, where the CLT tool is rotated in order to allow the end cutter, inside chamfer cutter and outside chamfer cutter to machine the ammunition casing to a predetermined overall length in preparation for a firearm ammunition reload.

2. The CLT tool of claim 1, wherein the end cutter, inside chamfer cutter and outside chamfer cutter can each be independently adjusted without affecting cutting results of the other cutters.

3. The CLT tool as in claim 1, further comprising:
an adapter having a shank for use with a power tool to rotate the CLT tool.

4. A Case Length Trimmer (CLT) cutting tool for use in reloading firearm ammunition comprising:
a multi-cutter housing;
an end cutter;
an inside chamfer cutter;
an outside chamfer cutter;
a pilot sized to fit a casing neck;
a case length stem;
a pin sized to fit to a casing flash hole;
a case length hard-stop;
a casing holder;
an adapter having a shank for use with a power tool or handle; and
wherein the CLT tool is used in machining a casing to a predetermined overall length in preparation for a firearm ammunition reload.

5. The CLT tool of claim 4, wherein the end cutter, inside chamfer cutter and outside chamfer cutter can each be independently adjusted without affecting cutting results of the other cutters.

6. The Case Length Trimmer (CLT) as in claim 4, further comprising a Micro-Adjustment Tool (MAT) used to make fine adjustments to the CLT comprising:
a MAT body:
a threaded, keyed, magnetic, or other MAT attachment feature;
a multiple thread thimble and spindle having an anti-rotation structure;
a threaded, keyed, magnetic, or other spindle attachment feature; and
wherein the MAT is used to make fine adjustments for positioning items in a CLT and any type of component requiring precise fine adjustment.

7. A method for preparing a brass firearm casing for reloading using a Case Length Trimmer (CLT) for trimming the casing to length, or squaring the casing using the steps of:
a) selecting the appropriate pilot, case length stem (CLS), flash hole pin (FHP), shell holder retainer and cutter;
b) adjusting a pilot protrusion to set the casing length with a threaded micro-adjustment tool (MAT);
c) adjusting the cutters with the MAT with multiple test cuts;
d) spinning either the CLT or casing holder;
e) guiding the mouth of a casing neck with a pilot;
f) guiding the flash hole of the casing base with the FHP; and
g) stopping cutting action by contacting the FHP with a hard-stop.

* * * * *